(12) United States Patent
O'Neill

(10) Patent No.: US 9,450,265 B2
(45) Date of Patent: Sep. 20, 2016

(54) COMPACT FUEL CELL SYSTEM WITH FUEL CELL IN FLUID TANK

(75) Inventor: Jonathan Daniel O'Neill, Manchester, CT (US)

(73) Assignee: Audi AG, Ingolstadt (DE)

( * ) Notice: Subject to any disclaimer, the term of this patent is extended or adjusted under 35 U.S.C. 154(b) by 1062 days.

(21) Appl. No.: 13/454,270

(22) Filed: Apr. 24, 2012

(65) Prior Publication Data
US 2013/0280640 A1 Oct. 24, 2013

(51) Int. Cl.
| | | |
|---|---|---|
| *H01M 8/10* | (2016.01) | |
| *H01M 8/24* | (2016.01) | |
| *H01M 8/04* | (2016.01) | |

(52) U.S. Cl.
CPC ....... *H01M 8/2475* (2013.01); *H01M 8/04029* (2013.01); *H01M 8/04126* (2013.01); *H01M 8/04134* (2013.01); *H01M 8/04119* (2013.01); *H01M 2008/1095* (2013.01); *Y02E 60/50* (2013.01)

(58) Field of Classification Search
CPC ............... H01M 8/04029; H01M 8/04067; H01M 8/04074; H01M 8/04126; H01M 8/04134; H01M 8/04119; H01M 8/2475; H01M 2008/1095; Y02E 60/50
See application file for complete search history.

(56) References Cited

U.S. PATENT DOCUMENTS

| | | | |
|---|---|---|---|
| 2,487,786 A | 11/1949 | Bogle | |
| 3,923,546 A | 12/1975 | Katz et al. | |
| 3,972,735 A | 8/1976 | Breault | |
| 6,007,932 A * | 12/1999 | Steyn | 429/456 |
| 6,383,361 B1 | 5/2002 | Moulthrop, Jr. et al. | |
| 6,635,374 B1 | 10/2003 | Aramaki | |
| 6,783,882 B2 | 8/2004 | Schmidt | |
| 7,732,079 B2 | 6/2010 | Wakahoi et al. | |
| 2004/0247958 A1 | 12/2004 | Sakakida et al. | |
| 2005/0095473 A1 | 5/2005 | Sakakida et al. | |
| 2006/0029848 A1 | 2/2006 | Kaye et al. | |
| 2006/0246337 A1 * | 11/2006 | Sarkar et al. | 429/34 |
| 2007/0020497 A1 * | 1/2007 | Ryoichi et al. | 429/32 |
| 2009/0023025 A1 * | 1/2009 | Korsgaard | 429/26 |
| 2013/0209910 A1 * | 8/2013 | Horn et al. | 429/436 |

* cited by examiner

*Primary Examiner* — Raymond Alejandro
(74) *Attorney, Agent, or Firm* — Seed IP Law Group PLLC

(57) ABSTRACT

An example fuel cell system includes a fuel cell power plant and a tank providing a volume that is configured to hold a fuel cell fluid. The fuel cell power plant is at least partially disposed within the volume.

16 Claims, 2 Drawing Sheets

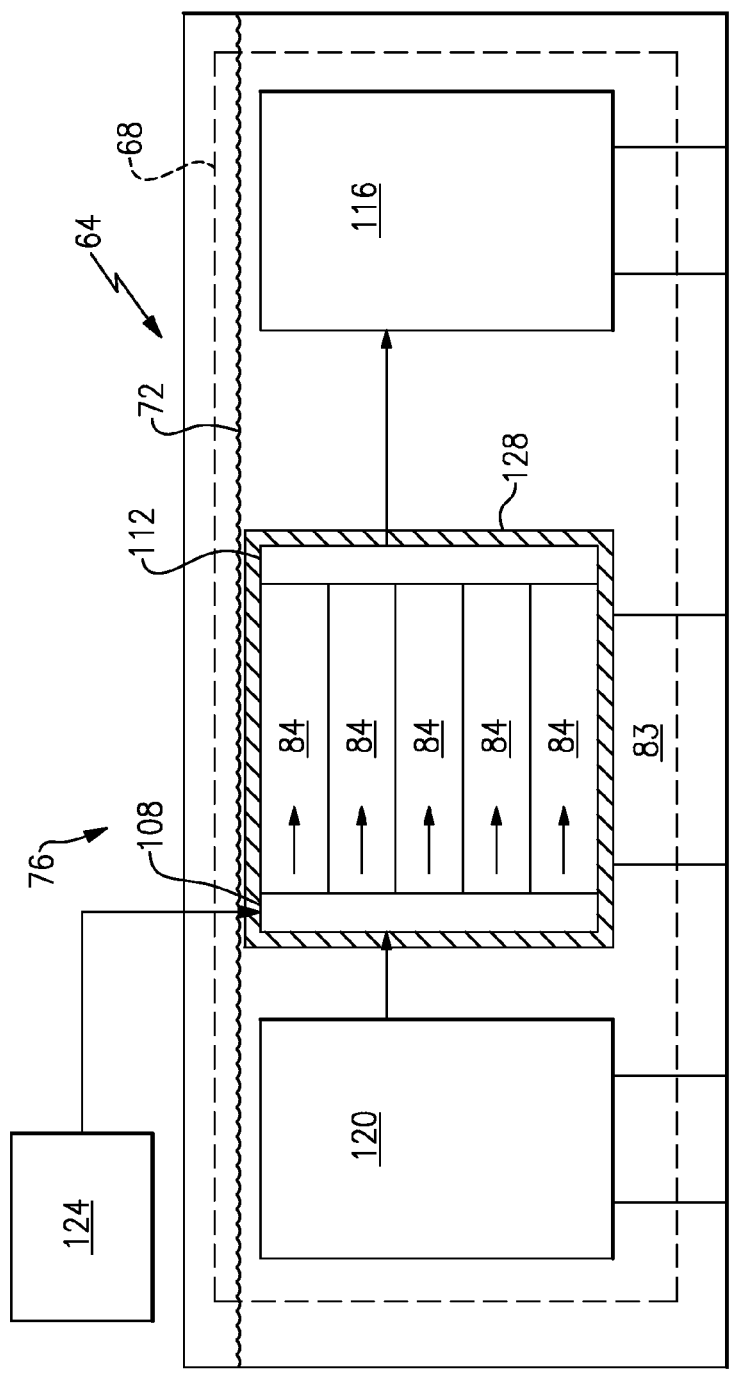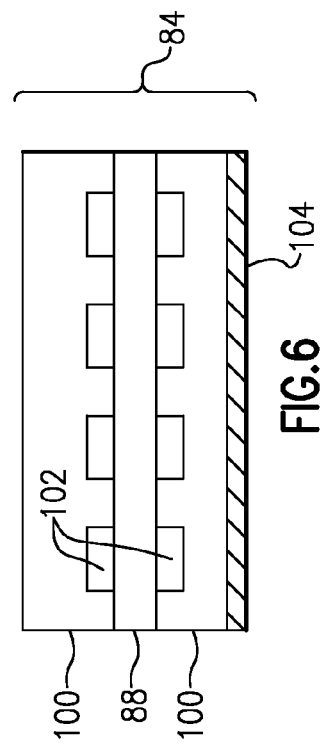

COMPACT FUEL CELL SYSTEM WITH FUEL CELL IN FLUID TANK

BACKGROUND

This disclosure relates generally to fuel cell systems and, more particularly, to packaging a fuel cell system within a relatively small volume.

Fuel cell systems are well-known. As shown in the FIG. 1, a fuel cell system 2 generally includes a fuel cell power plant 4 and a storage tank 6. During operation of the fuel cell system 2, fluid for cooling and/or humidification, such as water, flows to and from the fuel cell power plant 4 along a path 8. The water circulates through the fuel cell power plant 4 to cool or humidify the fuel cell power plant 4. The storage tank 6 holds the fluid that is not being circulated. The storage tank 6 is separate from the fuel cell power plant 4.

Packaging fuel cell fluids and the fuel cell power plant may be difficult, especially if space is limited.

SUMMARY

An example fuel cell system includes a fuel cell power plant and a tank providing a volume that is configured to hold a fuel cell fluid. The fuel cell power plant is at least partially disposed within the volume.

An example fuel cell system includes a fuel cell fluid supply and a fuel cell power plant that receives a fuel cell fluid from the fuel cell fluid supply. At least a portion of the fuel cell power plant is immersed within the fuel cell fluid.

An example method of packaging a fuel cell system includes providing a container configured to hold a fluid, and placing a fuel cell power plant within the container in a position where the fuel cell stack power plant will be in direct contact with a fluid inside the container.

DESCRIPTION OF THE FIGURES

The various features and advantages of the disclosed examples will become apparent to those skilled in the art from the detailed description. The figures that accompany the detailed description can be briefly described as follows:

FIG. 5 shows a more detailed schematic view of the fuel cell system of FIG. 4.
FIG. 6 shows an individual fuel cell from the fuel cell system of FIG. 5.

DETAILED DESCRIPTION

Figure 1:
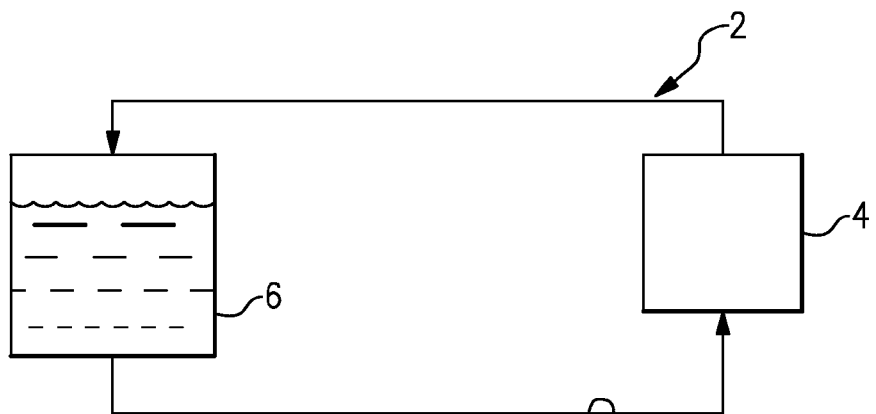
FIG. 1 shows a PRIOR ART fuel cell system.
Figure 2:
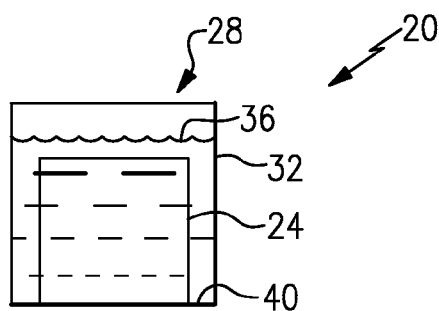
FIG. 2 shows an example fuel cell system.

Referring to FIG. 2, an example fuel cell system 20 includes a fuel cell power plant 24 at least partially disposed within a volume 28 of a tank 32 (or container). In addition to the fuel cell power plant 24, the tank 32 also contains a fuel cell fluid 36 that is utilized by the fuel cell power plant 24 during operation. In this example, the tank 32 establishes a volume 28, and at least some of that volume 28 is occupied by the fuel cell power plant 24 and the fluid 36. The fuel cell fluid 36 is water in this example.

The fuel cell fluid 36 fills the voids between the various components of the example fuel cell power plant 24, and the example fuel cell power plant 24 is submersed entirely within the fuel cell fluid 36. Because the fuel cell fluid 36 makes use of the otherwise void spaces between the components of the fuel cell power plant 24, an additional volume may no longer be required for the fuel cell fluid 36, and the overall volume of the fuel cell system 20 is reduced.

The example fuel cell power plant 24 generally has a cuboid shape. The fuel cell power plant 24 is covered on five sides by the fuel cell fluid 36. The remaining sixth side directly contacts a bottom surface 40 of the tank 32.

As can be appreciated, the fuel cell power plant 24 consists of several subsystems with various components, the fuel cell power plant 24 as a whole can be packaged to fit a variety of envelope shapes, not just cuboid. Some of the various components are cuboid, but some have other shapes such as cylindrical. The tank 32 can also have various shapes, including cylindrical, cuboid, etc.

During operation, the example fuel cell system 20 generates an electric current in a known manner utilizing an electrochemical reaction between reactant gases, for example. The disclosed arrangement of the fuel cell system 20 is only an example and the concepts disclosed herein may be applied to other types of fuel cell systems.

Figure 3:
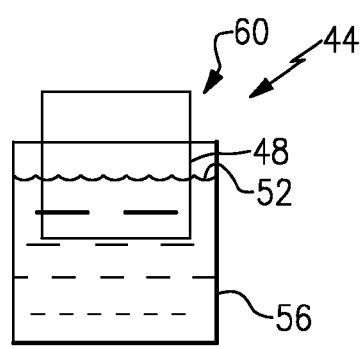
FIG. 3 shows another example fuel cell system.

Referring to the example of FIG. 3, another fuel cell system 44 includes a fuel cell power plant 48 that is partially disposed within a tank 56. A fuel cell fluid 52 fills some of the void spaces between components in the fuel cell power plant 48. By placing some of the fuel cell fluid 52 in the void spaces between the components of fuel cell power plant 48, the need for additional volume with which to contain fuel cell fluid 52 is decreased. The fuel cell power plant 48 is considered to be partially disposed in the fuel cell fluid 52 because some components of the fuel cell power plant 48 are not immersed within the fuel cell fluid 52. At least some of a volume 60 of the tank 56 is occupied by the fluid 52 and by some components of the fuel cell power plant 48.

Figure 4:
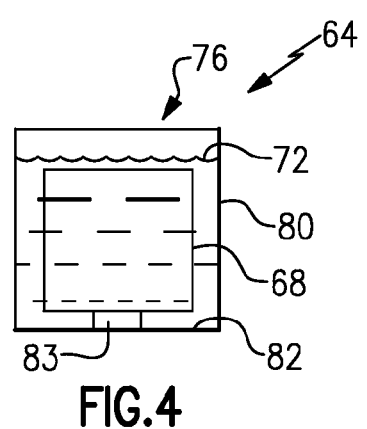
FIG. 4 shows yet another example fuel cell system.

Referring to FIG. 4, yet another example fuel cell system 64 includes a fuel cell power plant 68 that is completely submerged within a fuel cell fluid 72. A volume 76 of a tank 80 is at least partially occupied by the fuel cell fluid 72 and the fuel cell power plant 68. The fuel cell fluid 72 is water in this example. In another example, the fluid is glycol.

The fuel cell power plant 68 is spaced from a vertical bottom 82 of the tank 80. This example includes supports 83 to keep components of the fuel cell power plant 68 spaced from the surface 82. The fuel cell fluid 72 is thus held in direct contact with all surfaces of all components of the fuel cell power plant 68 that are not in contact with supports 83 or other components of the fuel cell power plant 68.

Referring now to FIGS. 5 and 6 with continuing reference to FIG. 4, one core component of the fuel cell power plant 68 is one or more fuel cell units 84 that are stacked in a known manner to provide a fuel cell stack assembly.

Each fuel cell unit 84 forms a portion of a polymer electrolyte membrane fuel cell in this example. The fuel cell unit 84 is a phosphoric acid fuel cell in another example.

In this example, each of the fuel cell units 84 includes an electrode assembly 88, and flow field plates 100 having channels 102 that deliver reactant gases, such as hydrogen and air, to the electrode assembly 88. One of the flow field plates 100 may deliver air to the cathode side of the electrode assembly 88 and another of the flow field plates 100 may deliver hydrogen to an anode side of the electrode assembly 88.

A coolant plate 104 is also located within the fuel cell unit 84. The coolant plate 104 includes channels that communicate coolant through the fuel cell units 84.

In this example, manifolds 108 and 112 facilitate directing fuel cell fluids to and from the fuel cell units 84. The example manifolds 108 and 112 are located at the laterally outer sides of the fuel cell units 84. The example types of fuel cell fluids delivered by the manifolds 108 to the fuel cell units 84 include air, hydrogen, and water. Manifolds are located in other positions in other examples. Fuel cell fluids also may be delivered to the fuel cell units 84 without manifolds.

In this example, the manifold 108 delivers water to the coolant plates 104 of the fuel cell units 84. The manifold 112 then receives water that has passed through one or more channels of the coolant plates 104 of the fuel cell units 84 where it absorbs heat from within the stack of fuel cell units 84. The heated water leaving the manifold 112 carries thermal energy from the fuel cell units 84. The heated water may be directed from the manifold 112 to a heat exchanger 116 to remove thermal energy. Water that has evaporated into the reactant gases of the fuel cell units 84 may be exhausted out from the fuel cell system 64.

In addition to the stack of the fuel cell units 84, the fuel cell power plant 68 may include reactant processing subsystems, thermal management subsystem, electrical connections/controllers/hybridization, and structural supports, as is known. Each subsystem may be composed of various components, including but not limited to heat exchangers, condensers, pumps, blowers, compressors, regulators, ejectors, separators, valves, pipes, line heaters, electronics, humidifiers, load cables, sensors, demineralizers, filters, energy storage devices, inverters, and converters.

The fuel cell power plant 68 includes a fluid stream through which fluid 72 flows to provide cooling and/or humidification. In some cases, some of fluid 72 evaporates and may be exhausted out. If fluid 72 is a product (such as water) of the fuel cell reaction, it may be used to replenish the tank 80.

A pump 120 is used to circulate water along the fluid stream from inside the tank 80 into the manifold 108. In this example, the pump 120, the fuel cell units 84 and the heat exchanger 116 are all completely immersed within the fuel cell fluid 72. In other examples, one or more of the pump 120, the fuel cell units 84 and the heat exchanger 116 may be only partially immersed within the fuel cell fluid 72.

In some examples, the fuel cell power plant 68 includes a fluid inlet pipe and a fluid exit pipe. These pipes (not shown) supply fluid to the fluid inlets of the appropriate components of the fuel cell power plant 68 to remove fluid from the fluid exits of the appropriate components of the fuel cell power plant 68. As an example, the pump 120 may be a water pump located downstream of the stack of fuel cell units 84. By the action of the pump 120, water is directed from the tank 80 through the inlet pipe, a cell stack assembly water inlet manifold, the cell stack assembly water flowfields, a cell stack assembly water exit manifold, a water pump connection, the pump 120, an exit pipe, and back into the storage tank.

A supply 124 of another fuel cell fluid, such as glycol, may be located outside of the volume 76. In some examples, the supply 124 is located partially or completely within the volume 76. In other examples, the fluid in which the fuel cell power plant is immersed may serve to humidify a reactant stream rather than cooling the cell stack assembly.

The fuel cell power plant 68 can be either assembled within the tank 80 or assembled and then placed in the tank 80. The void volume between components of fuel cell power plant 68 is at least partially filled with the fuel cell fluid 72.

As needed, any component of the fuel cell power plant 68 that is placed in the tank 80 is individually wrapped in a skin that is substantially impervious to the fluid 72. The various components of the fuel cell power plant 68 are coated with a skin 128 to prevent the fuel cell fluid 72 from contacting components of fuel cell power plant 68 where such contact would be undesirable. The example skin 128 is an electrical insulator and is waterproof. The skin 128 thus insulates electricity generated by the fuel cell power plant 68 from the fuel cell fluid 72. The skin 128 is a coating, wrap, or an entirely separate structure.

Nearly all components of the example fuel cell power plant 68 are covered with the skin 128. In another example, only selected components of the fuel cell power plant 68 are wrapped with the skin 128. These portions may be the most prone to damage due to contact with the fuel cell fluid 72. Example types of skin 128 may include rubber, a plastic wrap, Teflon®, etc.

The example of FIGS. 4-6 utilizes water as a fuel cell fluid. In another example, glycol is the fuel cell fluid. That is, the example fuel cell power plants 24, 48, and 68 could be partially or completely immersed in fuel cell fluids other than water.

Features of the disclosed examples include a fuel cell system having a relatively small packaging space due to storing a fuel cell fluid in previously unused open spaces between components in the fuel cell power plant. In some examples, the fuel cell power plants have a packing density of about 85%, which means that the fuel cell power plants have about 15% open space. The remaining 15% open space is thus able to store fuel cell fluids. The overall packaging space required to accommodate fuel cell systems is thus reduced.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A fuel cell system, comprising:
a fuel cell power plant including a side surface that is defined by an entire external perimeter of the fuel cell power plant;
a tank providing a volume that is configured to hold a fuel cell cooling fluid; and
a pump operably coupled to the fuel cell power plant to circulate the fuel cell cooling fluid, wherein the fuel cell power plant and the pump are at least partially immersed within the fuel cell cooling fluid and the side surface of the fuel cell power plant is in direct contact with a surface of the tank, wherein the fuel cell power plant comprises a polymer electrolyte membrane fuel cell unit, and wherein the fuel cell cooling fluid comprises water.

2. The fuel cell system of claim 1, wherein the tank contains the fuel cell cooling fluid and the fuel cell power plant is submerged within the fuel cell cooling fluid.

3. The fuel cell system of claim 2, wherein the fuel cell power plant has a plurality of components that are directly contacted by the fuel cell cooling fluid.

4. The fuel cell system of claim 3, wherein at least two components of the fuel cell power plant are at least partially submerged within the fuel cell cooling fluid.

5. The fuel cell system of claim 4, wherein the fuel cell cooling fluid fills at least some of the void spaces between components of the fuel cell power plant.

6. The fuel cell system of claim 1, comprising a waterproof and electrically insulating skin covering at least some components of the fuel cell power plant.

7. A fuel cell system, comprising:
a fuel cell fluid supply;
a fuel cell power plant that receives a fuel cell cooling fluid from the fuel cell fluid supply;
a heat exchanger external to the fuel cell power plant and operably coupled to the fuel cell power plant; and
a pump operably coupled to the fuel cell power plant to circulate the fuel cell cooling fluid, wherein at least a portion of the fuel cell power plant, at least a portion of the pump, and at least a portion of the heat exchanger are immersed within the fuel cell cooling fluid, wherein the fuel cell power plant comprises a polymer electrolyte membrane fuel cell unit, and wherein the fuel cell cooling fluid comprises water.

8. The fuel cell system of claim 7, wherein the fuel cell power plant is immersed entirely within the fuel cell cooling fluid.

9. The fuel cell system of claim 7, wherein at least two components of the fuel cell power plant are at least partially submerged within the fuel cell cooling fluid.

10. The fuel cell system of claim 9, wherein the fuel cell cooling fluid fills at least some of the void spaces between components of the fuel cell power plant.

11. A method of packaging a fuel cell system, the method comprising:
providing a container configured to hold a fuel cell cooling fluid;
providing a heat exchanger external to a fuel cell power plant and operably coupled to the fuel cell power plant to facilitate removal of heat from the fuel cell cooling fluid;
providing a pump operably coupled to the fuel cell power plant to circulate the fuel cell cooling fluid; and
placing the fuel cell power plant, the pump, and the heat exchanger within the container in a position wherein the fuel cell power plant, the pump, and the heat exchanger will be in direct contact with the fuel cell cooling fluid inside the container, wherein the fuel cell power plant comprises a polymer electrolyte membrane fuel cell unit, and wherein the fuel cell cooling fluid comprises water.

12. The method of claim 11, wherein the fuel cell cooling fluid and the fuel cell power plant are held within a common tank.

13. The method of claim 11, including moving some of the fuel cell cooling fluid through components of the fuel cell power plant during operation of the fuel cell.

14. The method of claim 11, wherein at least two components of the fuel cell power plant are at least partially submerged within the fuel cell cooling fluid.

15. The method of claim 14, wherein the fuel cell cooling fluid contacts all components of the fuel cell power plant.

16. The method of claim 11, wherein the total volume taken up by the fuel cell system is less than that of a fuel cell system which is the same in every respect except that the fuel cell cooling fluid is packaged as a separate component rather than within the void spaces between components of the fuel cell power plant.

* * * * *